(12) United States Patent
Wilson, Jr. et al.

(10) Patent No.: US 8,421,263 B2
(45) Date of Patent: Apr. 16, 2013

(54) FLOATING VERTICAL AXIS WIND TURBINE

(75) Inventors: Jack W. Wilson, Jr., Palm Beach Gardens, FL (US); John E. Ryznic, Palm Beach Gardens, FL (US); Joseph D. Brostmeyer, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 335 days.

(21) Appl. No.: 12/913,023

(22) Filed: Oct. 27, 2010

(65) Prior Publication Data

US 2012/0104762 A1    May 3, 2012

(51) Int. Cl.
*F03D 9/00* (2006.01)
(52) U.S. Cl.
USPC ........................................................... 290/55
(58) Field of Classification Search ............. 290/54, 290/55, 43, 44; 415/60, 68, 69
See application file for complete search history.

(56) References Cited

U.S. PATENT DOCUMENTS

| | | | | |
|---|---|---|---|---|
| 3,988,592 A | * | 10/1976 | Porter | 290/53 |
| 7,462,950 B2 | * | 12/2008 | Hu | 290/55 |
| 7,566,983 B1 | * | 7/2009 | Lyatkher | 290/54 |
| 2009/0072544 A1 | * | 3/2009 | Pao | 290/55 |
| 2011/0062716 A1 | * | 3/2011 | Zeuthen et al. | 290/55 |
| 2012/0261923 A1 | * | 10/2012 | Hassavari | 290/53 |

* cited by examiner

*Primary Examiner* — Vanessa Girardi
(74) *Attorney, Agent, or Firm* — John Ryznic

(57) ABSTRACT

A large floating vertical axis wind turbine with a floating inner cylinder having rotor blades that rotate together as an assembly, and a floating outer cylinder with a central opening in which the floating inner cylinder rotates for support against tipping. Outriggers with floating devices on the ends extend out from the floating outer cylinder for additional stability. The floating inner cylinder is partially supported by a top bearing on the outer cylinder to carry some of the load from the rotor blades.

15 Claims, 5 Drawing Sheets

FLOATING VERTICAL AXIS WIND TURBINE

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a wind turbine, and more specifically to a large floating vertical axis wind turbine.

2. Description of the Related Art Including Information Disclosed Under 37 CFR 1.97 and 1.98

Wind turbines are used to generate electrical energy from wind. Wind turbines can be horizontal axis wind turbines or vertical axis wind turbines (also referred to as Darrieus turbines). The horizontal axis wind turbines are the most common of the two types and typically include three blades extending out from a central hub and looks like a giant propeller blade. Wind turbines are mostly used on land, but are starting to be used offshore in deep water because that is where strong and sustainable wind is found.

Giant horizontal axis wind turbines have been built in the range of up to 5 MWatts in power. However, the most common size is in the 1 to 2 MW size. Use of the smaller horizontal axis wind turbines is preferred because they last longer than the larger ones. The larger the turbine, the heavier the weight of the blades. Horizontal axis wind turbines require bearings to rotatably support the very heavy turbine blades. The bearings cannot handle the heavy loads from these larger turbines and thus fail often.

Another design problem with horizontal axis wind turbines is the gear box. A gear box is required to step up the rotational speed from the slow blade hub shaft to the shaft of the generator. The gear box is what typically fails first in these horizontal axis wind turbines. The gear box is also located in the nacelle, which is located on top of a tall tower that can be 300 feet in height. The nacelle is the enclosed unit in which all the contents of the electrical energy generating equipment is located. These important parts of the turbine are therefore located in difficult to reach location.

Wind turbines are being considered for use off shore because of the strong winds available. Currently, a typical horizontal axis wind turbine is being placed on a tall floating cylinder that is anchored to the sea bed by cables. Most of the cylinder floats below the water surface with the wind turbine mounted on the top surface and operating just like those located on land. These offshore wind turbines also suffer from the same problems discussed above.

One prior art wind turbine that solved the problem with the bearings is U.S. Pat. No. 7,397,144 issued to Brostmeyer et al on Jul. 8, 2008 and entitled BEARING-LESS FLOATING WIND TURBINE and in which the applicant's of the present invention are also inventors of this patent. Instead of supporting the turbine blades by bearings, the Brostmeyer patent uses a giant doughnut shaped floating barge on which the blades are fixed to rotate along with. Thus, the blades rotate along with the floating barge. With this design, the blades can be as large as structurally possible without any concern for bearings. One problem since discovered by the inventors has been the large surface area of the floating barge that is exposed to the water. A large viscous force would be formed as the floating barge rotates within the body of water. This large viscous force would have to be overcome by any torque developed by the wind reacting on the vertical axis blades.

In an attempt to overcome the problems described above and with the Brostmeyer patent above, the applicant's developed the next generation bearingless floating wind turbine that is described in U.S. Pat. No. 7,750,492 issued to Ryznic et al. on Jul. 6, 2010 and entitled BEARINGLESS FLOATING WIND TURBINE. This design uses a floating support that has a long narrow neck with a larger diameter bulb section on the bottom end and a larger diameter section on the top end. Because of the narrow neck section, the surface area for exposure to the water is significantly reduced over that of the first generation bearingless floating wind turbine with the doughnut shaped floating barge. The larger diameter bulb section on the bottom is filled with a ballast material and thus lowers the center of gravity of the floating wind turbine below the center of buoyancy. In this design, the blades are vertical axis turbine blades or Darrieus type blades.

Another benefit to the second generation bearingless floating wind turbine is that a large diameter permanent magnet electric generator can be used instead of the prior art generators that require a gear box. These permanent magnet generators are direct drive generators and therefore do not use a gear box. These direct drive generators are not used in the vertical axis wind turbines because they cannot be integrated in the small space and at the great heights that sit on top of the tall towers. Because the second generation bearingless floating wind turbine uses a floating cylinder with a large diameter space on top, a large diameter vertical axis permanence magnet direct drive generator can be used. The applicant's have since discovered that this second generation floating vertical axis wind turbine tends to tilt to one side during operation because of the lack of upper buoyancy support for the tall and narrow neck section.

BRIEF SUMMARY OF THE INVENTION

A large floating vertical axis wind turbine that requires minimal bearing support for the rotating turbine. The blades are vertical axis rotor blades that are secured to a tall and narrow floating inner cylinder. A tall tower can be used that extends from a top of the floating inner cylinder and supports the vertical axis rotor blades. A floating support outer cylinder includes a doughnut shaped floating section with a central opening in which the tall and narrow floating inner cylinder floats with rotation. A number of outriggers extend outward from the floating support outer cylinder each with floatation devises on the ends that function as a support for the tall and narrow floating inner cylinder to prevent tipping. The floating inner cylinder is filled with enough ballast so that most of it is submerged in the water. A bearing on the top of the floating support outer cylinder rotatably supports the tall and narrow floating inner cylinder, and therefore the rotor blades, so that more stability is created. An electric generator is located between the floating inner cylinder and the support outer cylinder to generate electrical energy from the relative rotation of the two cylinders.

DETAILED DESCRIPTION OF THE INVENTION

Figure 1:
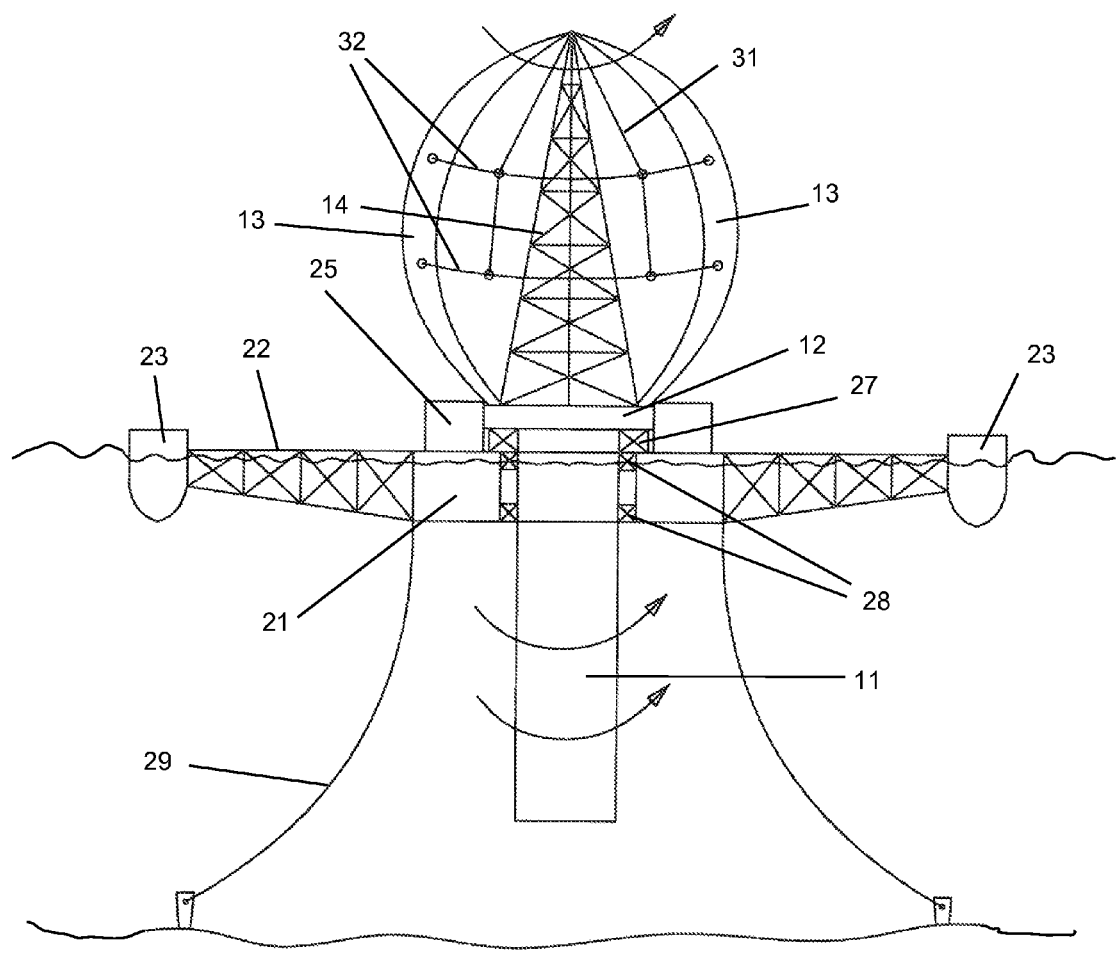
FIG. 1 shows a cross section side view of the giant floating vertical axis wind turbine of the present invention.

FIG. 1 shows the giant floating vertical axis wind turbine of the present invention. The wind turbine includes a tall and relatively narrow floating inner cylinder 11 that supports vertical axis rotor blades 13 that extend from a top cover plate 12 on the top end of the floating hollow inner cylinder 11. The blades 13, top plate 12 and inner cylinder 11 all rotate together as a single unit. Ballast is placed within the hollow floating inner cylinder 11 at the bottom end to lower a center of gravity of the inner cylinder and blade assembly. A central support tower 14 can be used to support the vertical axis rotor blades 13. Vertical and horizontal cables are also used to support the rotor blades and can be attached to a top of the central support tower 14. The wind turbine is anchored to the sea bed by cables 29 that can extend out from the outer cylinder 21 or the outriggers 22. Because of the design of the wind turbine of the present invention, the blades can be at tall as a skyscraper so that a much larger electric generator can be used. The prior art horizontal axis wind turbines are from 1.5 to 5 MW in power. A vertical axis wind turbine of the present invention with a blade height of 1,500 feet tall will produce around 90 MW of electrical energy.

Figure 2:
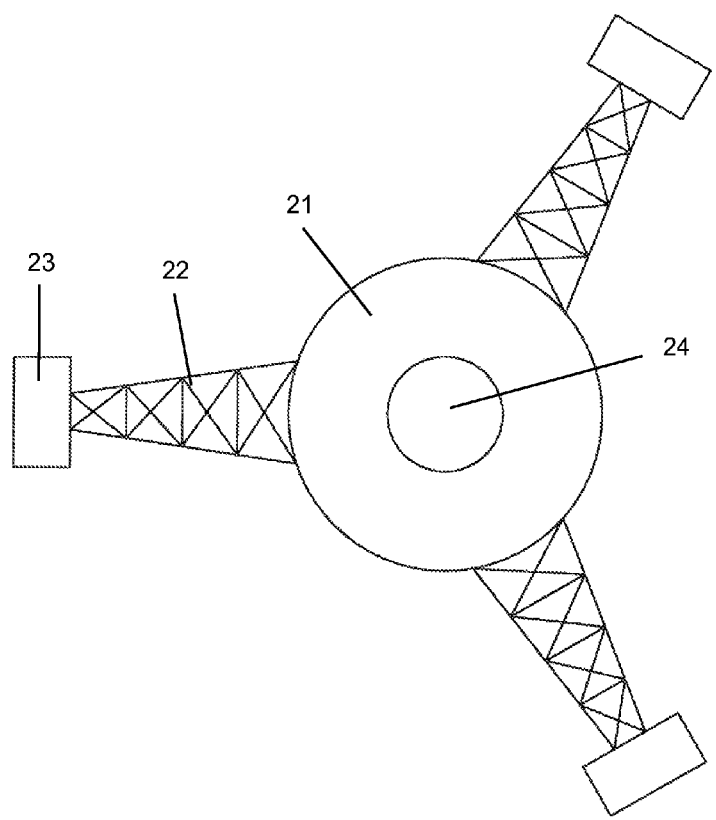
FIG. 2 shows a top view of the floating support outer cylinder of the present invention.

To support the floating inner cylinder 11 and blades 13, a floating outer cylinder 21 is used that includes a doughnut shaped floating outer cylinder 21 with a central opening 24 (see FIG. 2) and with a number of outriggers 22 extending outward that have additional floating devices 23 on the ends. The floating outer cylinder 21 is fully enclosed to prevent water from seeping into the inside and so that it will float upright in a body of water. An extension 25 extends from the top of the outer cylinder 21. The floating outer cylinder 21 does not rotate within the body of water but is a stationary support for the floating inner cylinder 11 and blades 13. In this embodiment, three outriggers 22 are used at equal spacing of around 120 degrees. The floating inner cylinder 11 is supported within the central opening 24 of the floating outer cylinder 21 to prevent the inner cylinder 11 and blade assembly from tilting too much. Side bearings 28 support the inner cylinder 11 within the central opening 24 and allow for relative rotation. In this embodiment, two sets of side bearings 28 are used with one on the top and another on the bottom ends of the central opening 24. A top bearing 27 is used to support the weight of the floating inner cylinder 11 on the top surface of the floating outer support cylinder 21. The top bearings are mounted between an underside of the top plate 12 and the top side of the outer support cylinder 21. Other arrangements can be used.

One of the features of the present invention is the use of the top bearings 27. Most of the weight of the vertical axis blades—and the central support tower, if used—is carried by the floating inner cylinder. To add stability and to support some of the weight of the rotor blades 13 and the tower 14, the top bearings 27 are used to support some of the weight of the inner cylinder and the support tower 14 on the outer support cylinder 21. Because most of the weight of the blades 13 and the support tower 14 is supported by the inner cylinder 11, use of bearings 27 can be functional. The main purpose of the top bearing 27 is to allow for some of the weight of the floating inner cylinder and the blades (and the tower if used) to be carried by the floating inner cylinder 21.

Figure 3:
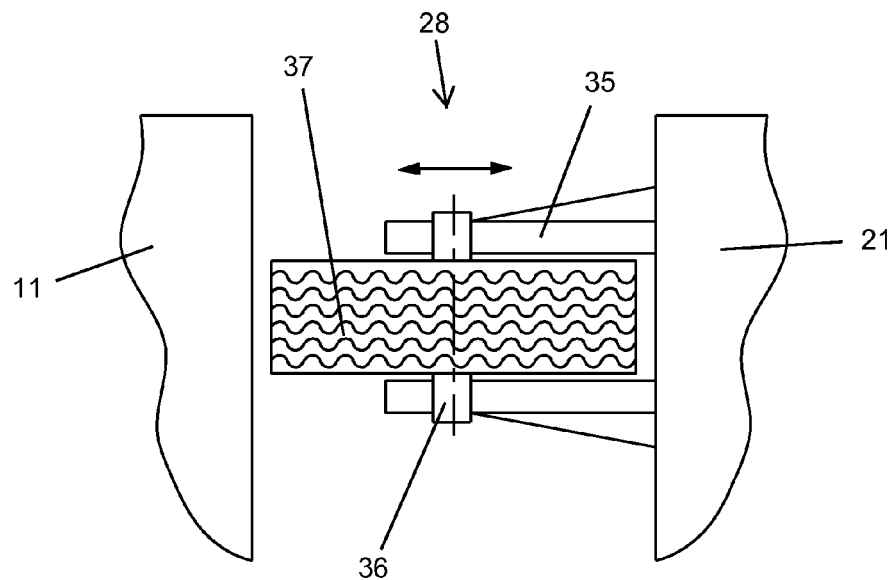
FIG. 3 shows a cross section view of one of the side bearings used in the present invention.

One of the side bearings 28 used between the inner cylinder and the central opening 24 of the outer cylinder 21 is shown in FIG. 3. The side bearing 28 includes a roller element 37 which could be a large high pressure tire like that used on heavy machinery equipment such as earth moving machinery. The roller element 37 is mounted on an axle 36 that is rotatably supported by two arms that extend from the side of the central opening 24 of the outer cylinder 21. A number of these side bearings 28 are spaced around the central opening 24 so that adequate support for the inner cylinder is produced. In one embodiment, the side bearings 28 can be made to move horizontally in order to adjust a spacing between the roller element 37 and the surface that it will make contact with. Adjustment of the side bearings is also useful in the assembly of the wind turbine as discussed below. The main purpose of the side bearings is to prevent excessive tilting of the floating inner cylinder 11 within the central opening 24 of the floating outer cylinder 21.

The wind turbine operates by a wind passing over the vertical axis rotor blades 13 that produce rotation along the vertical axis. The inner cylinder also rotates along with the blades 13. Rotation of the vertical axis wind turbine will also produce stability from a gyroscopic effect. As the inner cylinder rotates, the electric generator will produce electric energy due to the relative rotation of the rotor of the generator, which is attached to the inner cylinder, and the stator of the generator, which is attached to the outer cylinder. Electrical power lines can extend out from the outer cylinder and be connected to the anchor cables 29 to transmit the electric energy to a ground location. As the inner cylinder and the blade rotate, any attempt to tilt to one side will be prevented by the side bearings 28 with a minimal amount of friction loss.

Figure 9:
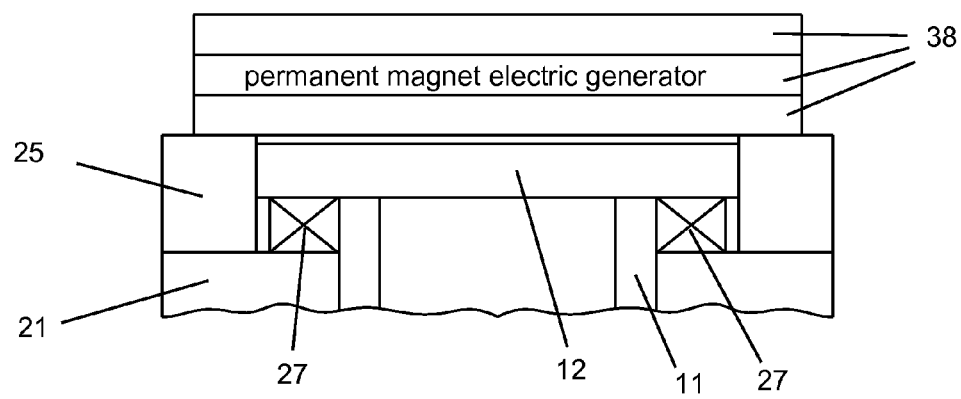
FIG. 9 shows a stack of permanent magnetic electric generators mounted between the stationary outer cylinder and the rotating inner cylinder.
Figure 4:
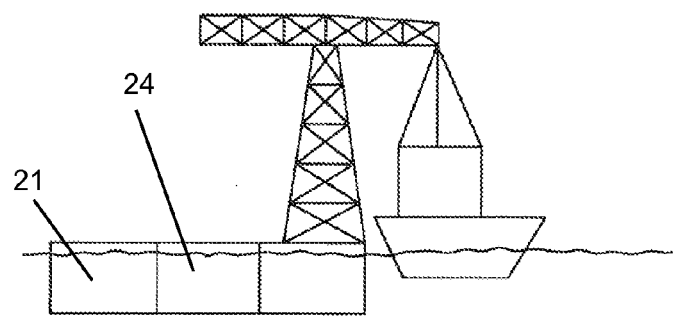
FIGS. 4 through 8 shows the steps used to assemble the giant floating vertical axis wind turbine of the present invention.

The vertical axis wind turbine of the present invention allows for the use of a direct drive electric generator which is a large diameter generator. In one embodiment, the direct drive electric generator can be a permanent magnet electric generator 38 with a diameter of around 25 feet that is oriented in a vertical rotational axis so that the generator can be supported by the top plate 12 and the upper surface of the floating outer cylinder. In another embodiment, several of these vertical axis permanent magnet generators 38 can be stacked one on top of another instead of manufacturing one giant generator as seen in FIG. 9. Permanent magnet generators use rare earth metals because of the high efficiency in generating electricity. If water cooling is needed for the generator, an amble source of cool water is available around the wind turbine.

Another feature of the present invention is the use of the floating outer cylinder 21 as a docking platform for a service boat to carry workers or equipment to and from the wind turbine. In previous designs, the floating cylinder was rotating and would limit access to the wind turbine. The wind turbine would have to be stopped or workers would have to jump onto a moving platform.

Figure 5:
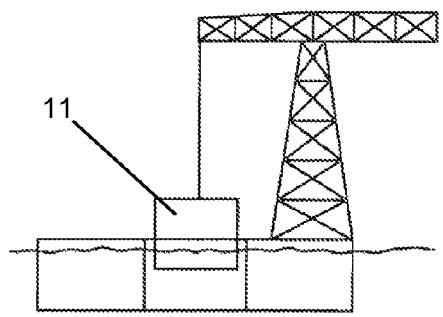
Figure 6:
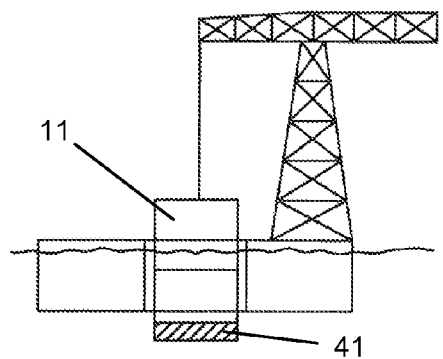
Figure 7:
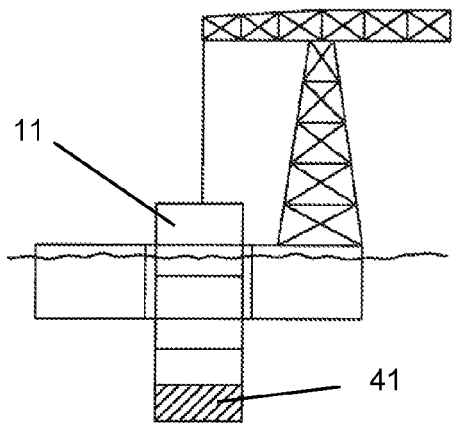
Figure 8:
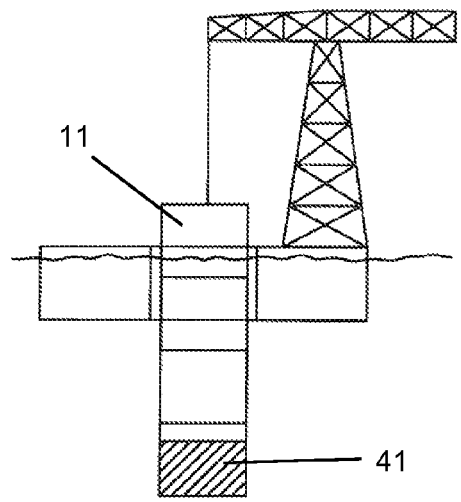

FIGS. 4 through 8 shows some of the steps in one of the methods for assembling the wind turbine of the present invention. The floating outer cylinder 21 is constructed first and then towed out to a location where the wind turbine will be used or where it can then be towed to a location where it will be used. A crane is used to lift a section of the inner cylinder in place within the central opening 24 of the floating outer cylinder. The floating inner cylinder 11 is built up from several sections. The first section has a bottom to enclose it. The crane can be located on a section of the floating outer cylinder 21 or on a separate vessel floating in the water adjacent to the floating outer cylinder. The first section is lifted into place so that is floats in the water within the central opening 24 as seen in FIG. 5. A second section is then lifted into place on top of the first section and welded together. At some time, a small amount of ballast 41 is added to the assembled inner cylinder sections to lower it in order to add additional cylinder sections as seen in FIG. 6. The inner cylinder sections are then built up one at a time and welded together to form the finished floating inner cylinder 11. As a new inner cylinder section is added, additional ballast 41 is added to lower the inner cylinder sections in the water so that the top is not too high above the floating outer cylinder for construction purposes as well as stability of the inner cylinder 11 within the outer cylinder 21. When all of the inner cylinder sections have been assembled, the top plate 12 is secured over the opening to enclose the hollow inner cylinder space.

If used, the central support tower 14 is then constructed on top of the top plate 14. The support tower 14 can also be used to assemble the vertical axis rotor blades 13. In this embodiment, two full hoops of Darrieus type rotor blades are used where each blade is offset at around 90 degrees. To add additional support for the rotor blades, horizontal cables 32 are used that extend from one blade to an opposite blade, or to the tower 14 if used. Because of the long horizontal distance between rotor blades, vertical support cables 31 are used to support the horizontal support cables 32 like that found in a suspension bridge such as the golden gate bridge.

Ballast within the inner cylinder 11 will lower the center of gravity of the inner cylinder and blade assembly to add stability. The floating outer cylinder will add stability at the upper end of the floating inner cylinder 11. The additional floating devices 23 on the outer ends of the outriggers 22 will add stability of the floating outer cylinder and therefore to the floating inner cylinder and blades. The anchor cables can be attached to the ends of the outriggers or the floating devices 23 that will add even more stability to the floating outer cylinder. The amount of ballast added should be just enough so that the weight of the inner cylinder and blades that is supported by the top bearing 27 is minimal in order that the top bearing 27 is not over-loaded. After the blades and the tower—if used—has been added to the floating inner cylinder 11, additional ballast can be added to control the total weight supported by the top bearing 27.

One problem with a vertical axis wind turbine is that it is not self starting. Thus, a starting device must be used. In one embodiment, a water pump with an annular arrangement of blades or buckets can be used on the floating inner cylinder or any parts that rotates with the blades that will use powerful water jets to reacts against the buckets and start the wind turbine rotating.

We claim the following:

1. A floating vertical axis wind turbine comprising:
   a floating inner cylinder having a height much greater than a diameter;
   a top plate secured to a top end of the floating inner cylinder;
   a vertical axis rotor blade secured to the top plate such that the floating inner cylinder rotates along with the rotor blade;
   a floating outer cylinder, having a central opening, stabilized and held stationary in part by an outrigger extending outward with a floating device secured to an end;
   the floating inner cylinder being rotatably supported within the central opening of the floating outer cylinder;
   a side bearing positioned between the central opening and the floating inner cylinder to rotatably support the floating inner cylinder; and
   an electric generator secured between the floating inner cylinder and the stationary floating outer cylinder such that electrical energy is produced when the floating inner cylinder portion of the wind turbine rotates.

2. The floating vertical axis wind turbine of claim 1, further comprising:
   a central support tower secured to the top plate and extending along the vertical axis; and
   the vertical axis rotor blade is supported by the central support tower.

3. The floating vertical axis wind turbine of claim 1, further comprising:
   a horizontal support cable system extending from one rotor blade to a second rotor blade to lend additional support between the rotor blades; and
   at least one vertical support cable connected to the horizontal support cable system.

4. The floating vertical axis wind turbine of claim 1, wherein:
   the electric generator is mounted between the top plate of the floating inner cylinder and the floating outer cylinder.

5. The floating vertical axis wind turbine of claim 1, wherein:
   the floating outer cylinder has a doughnut shape.

6. The floating vertical axis wind turbine of claim 1, wherein:
   the wind turbine has an electrical generating capacity greater than 10 mega watts.

7. The floating vertical axis wind turbine of claim 1, further comprising:
   a top bearing positioned between the top plate and the floating outer cylinder to rotatably support the floating inner cylinder.

8. The floating vertical axis wind turbine of claim 7, further comprising:
   a ballast located within a bottom end of the floating inner cylinder; and
   the ballast providing weight adjustments such that the floating inner cylinder does not exceed a load limit of the top bearing.

9. The floating vertical axis wind turbine of claim 1 and further comprising:
   at least one outrigger secured to the floating outer cylinder and extending perpendicular to the vertical axis; and
   a floating device secured to an outer end of the outrigger.

10. The floating vertical axis wind turbine of claim 9, further comprising:
    three outriggers each with a floating device are secured to the floating outer cylinder with each about equally spaced around the floating outer cylinder.

11. The floating vertical axis wind turbine of claim 1, wherein:
    the electric generator is a vertical axis direct drive permanent magnet generator.

12. The floating vertical axis wind turbine of claim 11, wherein:
    the electric generator is formed from a stack of electric generators.

13. A process for assembling a floating vertical axis wind turbine comprising the steps of:
    building a floating outer cylinder, having a central opening, capable of floating in a body of water;

towing the floating outer cylinder to a location in a body of water;

inserting a bottom section of the floating inner cylinder within the central opening such that the bottom section of the floating inner cylinder floats in the body of water within the central opening;

securing additional floating inner cylinder sections to successive sections, starting from the bottom section thus forming the floating inner cylinder; and adding ballast to the floating inner cylinder sections during assembly to lower the floating inner cylinder sections within the central opening.

14. The process for assembling a floating vertical axis wind turbine of claim 13, further comprising the step of:

capping the floating inner cylinder with a top plate;

placing a top bearing between the top plate and the floating outer cylinder.

15. The process for assembling a floating vertical axis wind turbine of claim 14, further comprising the step of:

assembling a vertical axis rotor blade onto the top plate; and adjusting ballast of the floating inner cylinder to within load limits.

* * * * *